United States Patent [19]
Westerinen et al.

[11] Patent Number: 6,119,185
[45] Date of Patent: Sep. 12, 2000

[54] COMPUTER SYSTEM CONFIGURATION APPARATUS AND METHOD THAT PERFORMS PRE-ASSIGNMENT CONFLICT ANALYSIS

[75] Inventors: Andrea R. Westerinen, Olympia, Wash.; Catherine C. Howe, Irmo, S.C.

[73] Assignee: NCR Corporation, Dayton, Ohio

[21] Appl. No.: 08/980,878

[22] Filed: Nov. 25, 1997

[51] Int. Cl.[7] .................................. G06F 9/02
[52] U.S. Cl. ................................ 710/104; 710/8
[58] Field of Search .................. 710/8, 10, 104; 713/1, 100

[56] References Cited

U.S. PATENT DOCUMENTS

| | | | |
|---|---|---|---|
| 4,633,392 | 12/1986 | Vincent et al. | 710/104 |
| 4,727,475 | 2/1988 | Kiremidjian | 710/104 |
| 5,257,387 | 10/1993 | Richek et al. | 395/800 |
| 5,444,642 | 8/1995 | Montgomery et al. | 364/550 |
| 5,517,646 | 5/1996 | Piccirillo et al. | 395/700 |
| 5,530,887 | 6/1996 | Harper et al. | 395/800 |
| 5,530,895 | 6/1996 | Enstrom | 395/829 |
| 5,555,401 | 9/1996 | Allen et al. | 710/8 |
| 5,689,726 | 11/1997 | Lin | 710/10 |

*Primary Examiner*—Glenn A. Auve
*Attorney, Agent, or Firm*—Steven J. Adamson

[57] ABSTRACT

Self-configuring computer apparatus and method thereof. The computer apparatus preferably includes logic that determines the available system resources and those devices that desire access to those resources. Using an artificial intelligence protocol, resource setting are allocated to the devices. All devices are preferably considered (i.e., parallel consideration) before assign of resource settings for a particular resource so that an efficient allocation is achieved. A method of performing such a configuration is also disclosed.

17 Claims, 4 Drawing Sheets

COMPUTER SYSTEM CONFIGURATION APPARATUS AND METHOD THAT PERFORMS PRE-ASSIGNMENT CONFLICT ANALYSIS

FIELD OF THE INVENTION

The present invention relates to configuring a computer system and, more specifically, to invoking artificial intelligence to achieve the configuration.

BACKGROUND OF THE INVENTION

Computer systems may be achieved in a variety of arrangements. They may consist of a single processor machine as is commonly the case in desk top implementations or in multiple processor machines. Furthermore, individual computers may be connected in intra- or internetwork arrangements.

Computers contain a plurality of devices, each dedicated to a particular function. These devices compete for a computer's resources and may include modems, scanners, external storage, sound/video cards, network adapters, printers, SCSI ports and keyboard/mouse, amongst others. It is often a challenge to configure a computer such that each of these devices has access to the computer's resources such as interrupt request lines, direct memory access (DMA) channels, memory or input and output address space, etc. Conflicts may arise that result in a service call to remedy the situation. One reason for the occurrence of such conflicts is that prior art configuration routines tend to configure devices in a serial manner allocating resource to each device as the device is detected, instead of analyzing all of the devices in a system and then making appropriate allocations that minimize conflict.

As the complexity of the system increases, so does the complexity of obtaining a working configuration. Thus, an increase in configuration problems is encountered in computers that have multiple processors, multiple memories and multiples of other resources such as buses and I/O channels.

It should also be recognized that many computers utilize difference operating systems, including but not limited to, UNIX, DOS, OS/2 and Windows platforms. In many cases obtaining a working configuration is dependent upon the assignment preferences of the operating system. A need thus exists for a configuration tool that is applicable to these varied operating systems.

SUMMARY OF THE INVENTION

Accordingly, it is an object of the present invention to provide a configuration apparatus and method that efficiently and intelligently configures a computing system to achieve enhanced performance and to minimize conflicts.

It is another object of the present invention to provide a configuration apparatus and method that analyzes the plurality of devices that desire access to a computing system's resources and determines an efficient manner of allocating the resource.

It is also an object of the present invention to provide a configuration apparatus and method that is applicable to computing systems that utilize different operating systems and to multiple processor systems.

These and related objects of the present invention are achieved by use of an apparatus and method for artificial intelligence based computer hardware configuration as described herein.

One embodiment of the present invention includes a self-configuring computer apparatus that comprises: processing logic that performs control and data processing functions; a plurality of resources that have resource settings therefor that are coupled to said processing logic and include at least interrupts and memory; a plurality of devices which require access to one or more of said plurality of resources; and configuration logic that assigns, substantially in parallel, two or more of said plurality of devices to said resources. Another embodiment of the present invention includes similar features and configuration logic that decides the order in which two or more of said plurality of devices are assigned to one of said plurality of resources before making an assignment of those two or more devices to that resource.

Other features of the present invention include logic that creates an ordered list of said plurality of devices which require access to said resources before assignment of a resource setting to one of said plurality of devices; logic that determines the order by which resource settings are allocated; logic that establishes a weighted valve for potential resource settings; and a rules based artificial intelligence protocol implementation.

A method of carrying out such a configuration is also provided.

The attainment of the foregoing and related advantages and features of the invention should be more readily apparent to those skilled in the art, after review of the following more detailed description of the invention taken together with the drawings.

DETAILED DESCRIPTION

The apparatus and method of the present invention invoke-a rule-based reasoning scheme for efficiently and intelligently configuring a computer system. A goal is to correctly configure a computer platform supporting ISA, EISA and/or PCI add-in adapters, and tune the resource assignments for performance. Knowledge on how to configure a system is gathered from sources such as experts who perform computer configurations and providers of devices and operating systems that are used in computers. From this information, Rules are generated which define the configuration process. The Rules based configuration program is generated by functionally grouping the rules into executable tasks such as "configuration" or "analysis" rules.

The Rules examine the system data compiled by the C++ code to determine the best order of configuration and to instruct the user how to resolve conflicts, amongst other features. The configuration rules preferably include those listed below in Table I—Rules. They are preferably implemented using an inference engine such as the Rete++ inference engine and the accompanying Eclipse Programming Language which are available commercially from The Haley Enterprise, Sewickley, Pa. This tool provides application program interfaces (APIs) to invoke the engine from the C++ control code and access data jointly between the C++ code and Rules code.

With the Eclipse language, Rules can be logically grouped into the Rulesets and/or Ruleset Agenda combinations to provide separately executable functions to the C++ function executing the Inference Engine. Pointers to the Rulesets and Agendas can be passed through the API function, "run()", to control which category (Ruleset or Agenda) to execute.

Figure 1:
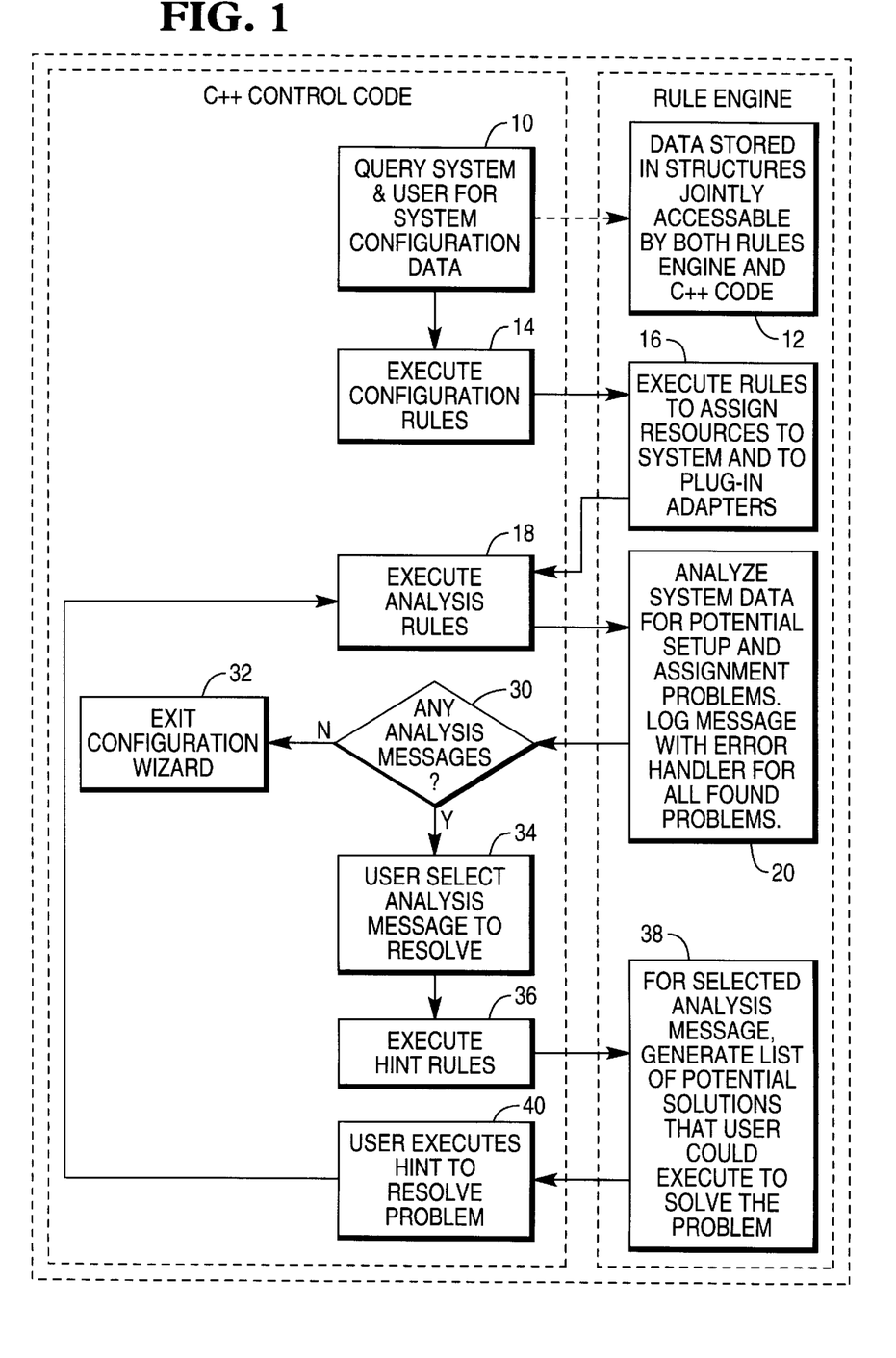
FIG. 1 is a flow diagram illustrating program flow between C++ control code and the Rules inference engine in accordance with the present invention.

Referring to FIG. 1, a representative flow diagram of an interface between the C++ control code and the Rules inference engine in accordance with the present invention is shown. It should be recognized that this diagram presents flow at a high level and does not include information such as error code checking and the like that would be apparent to a skilled programmer.

Step 10 represents queries conducted by the C++ control code to determine system resources and devices desiring access thereto. Step 12 indicates the storage of this information in memory structures accessible by both the C++ code and the inference engine. Step 14 indicates execution of the configuration rules. Flow then shifts to the inference engine wherein devices are assigned to system resources and configuration is performed (step 16). Following a completed configuration, control returns to the C++ code where an analysis of the proposed configuration is undertaken (step 18). In step 20, the analysis rules (described below) are carried out. These rules determine whether the configuration was successful.

Problems detected during analysis may be communicated to a user by generation of an appropriate message (step 30). If no problems are detected then the proposed configuration is saved and the configuration program is exited (step 32). If analysis messages are generated, the user selects the analysis message to resolve (step 34)) and the control code preferably executes problem solving "hint" rules (step 36). The inference engine is called for execution of the hint rules and generates potential solutions that a user can invoke to solve the problem (step 38). Flow then returns to the C++ code where a user executes one of the "hints" provided by the inference engine (step 40). Appropriate hint statements and their appropriate use would be apparent to one skilled in the art given the teachings herein.

In a preferred embodiment, the C++ control code utilizes a Dewey Development Toolkit called "Panel" or the like for creating a window and menu driven user interface. Implementation of this toolkit is known in the art.

Rules Implementation

In order to solve a problem, the Rete++ Inference Engine operates on coded rules and data or facts to make "inferred" decisions. This information is programmed for the Rete++ Inference Engine using the Eclipse programming language that is composed of relations, templates, and the Rules.

Eclipse relations and templates are the data storage structure for the Inference Engine. Instances of relations or templates become the facts which feed the Rules. The relations are used for data with only a few characteristics. The templates define a complex data storage structure. A template is made up of a name and a set of fields and is similar to a C++ class. Unlike classes, templates can only store data fields and not instances of other templates. Like classes, however, templates provide a mechanism to inherit from another template. For example, a base template of Device can be created along with child templates EisaIsa and PCI. An additional benefit to template inheritance is that any Rule written to match against the Device facts is also matched against facts instantiated using templates such as EisaIsa and PCI inheriting from Device.

Eclipse Rules follow the IF THEN syntax and have the following format:

```
IF
    <Data Condition 1>
    ...
    <Data Condition X>
THEN
    <action statements 1>
    ...
    <action statements Y>.
```

The Inference Engine applies the facts to the Rules and determines if any Rule's IF conditions have been met. If the facts satisfy the "IF", then the Rule is considered "activated." If one or more rules have been activated, the Engine selects the Rule with the highest priority to "fire." Once a rule has fired, the engine once again analyzes all facts and rules to identify the next rule to be fired.

For example, a rule may be written to match against PCI facts to support the following condition: IF an Adaptec PCI Adapter is in the system THEN print "Found Adaptec PCI Adapter." For this rule to work, it requires (1) a "PCI" template to be written, (2) a rule resembling the above statement to be coded, and (3) the runtime PCI facts (data facts) to be created. To implement this example, a template called "PCI" with data fields holding the PCI Device and Vendor could be created as follows:

```
(deftemplate PCI
    (super Device)          //inherit the fields of the
                            //"Device" template
    (field Name)            //store the PCI Name
    (field Location))       //store location
...
)
```

Once the template is defined, Rules can be written to match against the template fields. As mentioned previously, Eclipse Rules follow the IF THEN pattern and have the following syntax:

```
(defrule <Rule Name Goes Here>
    <pattern matching statements, or the "IF" part>
=>
    <action statements, or the "THEN" part>
```

In the PCI example, to match specifically against any Adaptec PCI devices, a rule is written to match against any "PCI" facts with Adaptec's Vendor Name. This rule would appear as:

```
(defrule LookForAdaptecPCIDevice
    (PCI (Name ADAPTEC))
=>
    (printout "Found Adaptec PCI Adapter.")
```

Upon running the inference engine, the PCI fact with PCIVendorID=9004 would cause the LookForAdaptecPCIDevice Rule to "activate." An activated rule means that the "IF" section of the rule is satisfied, but the "THEN" part has not been executed. Since no other activated rules of higher priority are also active, the inference engine selects this rule to "fire", i.e., execute the "THEN" part of the rule. Once the rule has been fired, this rule cannot be activated again by the same PCI fact. For this rule to be activated again one of the following must occur: (1) another PCI fact is created that has PCIVendorIC=9004; or (2) the original PCI fact needs to have some data member modified (PCIVendorID needs to remain 9004 for the rule to activate). In this case a modified fact appears to the inference engine as a new fact and can, therefore, reactivate the rule.

Rules can be assigned a priority level that would guarantee the execution order of Rules in cases of multiple Rule activation. Although the Eclipse programming language provides a method of assigning priorities to individual Rules, classifying Rules into groupings called "Rulesets," and "Agendas" is preferable for Rule control flow.

In a preferred embodiment, three Rulesets are created for implementing the Rules and they are the Miscellaneous, Configuration and Analysis Rulesets (hints are part of the Analysis ruleset). The Miscellaneous Ruleset contains various Agendas that are used to set up the system configuration data before a configuration or analysis can be attempted. This Ruleset preferably includes the Agendas of:

RunFunction which provides control for rules whose execution encompasses multiple rulesets and agendas, Reset which provides general data cleanup and data preparation, ClearProposed which removes proposed resource assignments, CopyToProposed which copies the selected assignments to proposed, CreateLists which creates a list of function identifications that need to have an assignment made, AssignSystemDefaults which is responsible for assigning all resources required by the System using system default information and operating system dependent information, Calculate-Availability which checks the availability of resources and settings and logs conflicts, and Resolve CFG which resolves error conditions such as those generated by check sums.

The Configuration Ruleset is used to make resource assignments for a selected resource type (IRQ, DMA, etc.). The Agendas for the Configuration Ruleset are run in parallel using Agenda priority (discussed below) to determine the Rule's execution flow. For example, all active Rules in the "FindConflicts" Agenda are fired before any active Rules in the "Assign" Agenda. This provides a "parallel" implementation. The Configuration Ruleset preferably includes the Agendas of (in order of priority):

Maintenance-AddSubFunction which updates the function list created in the Miscellaneous Ruleset's CreateList Agenda to contain subfunction information (where "subfunction" refers to a partitioning level utilized on EISA boards), Maintenance-Proposed which based upon the first function in the function list clears out all resources proposed for the previous function that are not part of the final setting selection, PnPMemReverse which provides additional Memory Calculation for PnP Devices if an allocation problem is experienced with the first assignment attempt, Maintenance-CalculateRange which calculates the legal starting address for setting ranges stored in multi-range format for memory and I/O port resources, FindConflicts, which identifies all setting option conflicts for the resources of the function/subfunction listed first in the function list, Maintenance-CalculateAvailability which based upon the conflicts, setting preferences and sharing status assigns an "availability" weight to a setting, Assign which assigns resources based on the availability weight, and ListMaintenance which removes an assigned or unconfigurable function/subfunction from the function list.

The Analysis Ruleset contains Agendas that are used to setup and analyze the system data, particularly after a proposed configuration has been achieved. This Ruleset includes the Agendas of:

Assignment which examines the results of the resource assignment process and identifies any unassigned resources and possible solutions therefor, Setup which examines the general setup characteristics of the system, Maintenance-Method which filters and logs messages with the error handler, and GeneralHints which creates solution hints for the logged messages.

All Agendas are implemented with appropriate Rule statements in the IF THEN syntax.

Table I which follows includes the configuration rules which are invoked during step 16 of FIG. 1 and constitute a significant part of the configuration process. The analysis rules (invoked during step 20 of s FIG. 1) implement the conditions listed with reference to step 140 of FIG. 2B, in addition to other configuration analysis considerations that would be apparent to one skilled in the art.

Table I—Configuration Rules

1. Assign system board resources before other devices.
2. Always configured the least flexible devices first.
3. Be aware of how the system BIOS or operating system may reconfigure PnP Devices the next time the system is rebooted. The extent of control for the configuration process is bounded by how BIOS and the operating system will implement the Utility's resource selections.
4. Not all resource options are created equal. Some options may not be supported by the operating system. Other options may be preferred by the manufacturer for performance reasons.
5. Resource sharing, if permitted, is only preferred for memory resources. Sharing among other resources may lead to decreased system performance. If forced to share, attempt to share between 'similar' devices first.
6. Devices will not be assigned a resource value already in use, unless sharing is permitted.
7. The ability to support dependent resource assignments must be supported.
8. PCI hardware dependency must be taken into account when assigning IRQ's.
9. Respect the memory ranges available for the system.
10. Respect memory range attributes within the compatibility region.
11. Be careful to account for PnP memory ranges', run time and install space.
12. For efficiency, avoid memory gaps in the compatibility region.
13. Do not permit overlapping between I/O ports within the ISA aliased regions.

While some of these rules are self-explanatory, the following comments are provided to further an understanding of implementation.

With respect to Rule 2 regarding configuring the least flexible devices first, this rule may be explained by the following IRQ example. A User is attempting to assign IRQ's to the following two devices: Device1 with IRQ options 1 & 2 and Device2 with IRQ options 1. These are two possible assignment outcomes for these devices: (1) Device1=IRQ 1, Device2=UNASSIGNED; and (2) Device1=IRQ 2, Device2=1 IRQ.

When Device1 is the first in the assignment order, both outcomes are possible. If the assignment results with option (1), the customer would have to intervene to change the IRQ assignments to make the system work.

When Device2 is the first in the assignment order, only outcome 2 is possible. Thus, the error condition is eliminated by configuring the device with the least number of IRQ setting options (i.e., least flexible) first. To try to avoid this situation during the assignment, a list of the devices can be used to determine the order in which the devices are configured. The least flexible devices would be at the front of the list, and the most flexible at the end. This scheme essentially represents a "parallel" approach of analyzing devices to be configured because the devices are analyzed before configuration begins. This process is contrary to is the serial configuration process of the prior art.

For each of the IRQ, DMA, and I/O port resources a list is preferably created and ordered in the following manner. A list with two groups, EISA/ISA Devices and PCI Devices is created, with the EISA/ISA group first in the list. The selection to assign PCI devices last stems from the fact that EISA and ISA adapters typically have fewer resource options than PCI Devices. The EISA/ISA Devices are ordered from the least number of options to the one with the most options. This ordering occurs only for the IRQ and DMA Resources. The PCI Devices are ordered according with the first unique instance of a PCI device grouped in the beginning of the PCI List (unique device determined using PCI Vendor ID and PCI Device ID).

Regarding memory, a list is created with two groups, PCI devices and EISA/ISA devices, and PCI devices are allocated first. PnP devices are assigned first because many users will be booting from a device that resides on a PCI bus. Thus, it is preferable to not allocated memory to an EISA/ISA device so that the device that the user must boot from will have its necessary memory. The PCI devices are ordered according to scan order (where scan ordering refers to a process in which the lowest numbered bus is first investigated for devices thereon, in sequential order, followed by a similar investigation of the second lowest numbered bus, and so on). Scan order is used to stack PCI memory assignments as close as possible to eliminate memory gaps caused by differing Install and Runtime sizes.

The EISA/ISA devices are ordered from largest to smallest memory requirements to eliminate memory gaps caused from boundary conditions and memory attribute conflicts.

The following two methods are preferably used to assign starting addresses to devices in the list. The goal of the address-ordering process is to push all EISA/ISA devices to the front of the ISA Expansion Area and the PCI Devices to the end of this Area. If enough memory is available, then the two groups will not meet. For PCI devices, the starting address are attempted sequentially from the highest memory address to the lowest memory address. The list of PCI devices will actually be in reverse scan order. The combination of the reverse scan order and address ordering attempts to pack the PCI devices at the end of the ISA Expansion Area. For EISA/ISA Devices, starting addresses are attempted sequentially from the lowest memory address to the highest memory address to pack these devices at the beginning of the ISA Expansion Region.

With respect to Rule 3 regarding PnP devices, limitations are placed upon what PnP resource assignments a PnP BIOS or Operating System will honor. For example, some BIOS's will provide a method for a Configuration Utility to store the resource options made by a configuration utility. Thus, the Configuration Rules need to be aware of what resource it can truly "configure." In the case of the Configuration Wizard, the configuration process can only assign IRQs. Although memory assignments may not be honored by the BIOS, the present configuration process preferably makes an attempt to "reserve" Expansion ROM memory in order to find the best fit of both the EISA, ISA, and PCI Memory requirements.

With respect to Rule 4 regarding assigning preferences, three levels of "preferences" for assigning resource values are preferably defined and they are system vendor recommended values, manufacturer recommended values and other values. The system vendor recommended values are determined in testing by the computer system vendor, and reflect the best possible setting for operation and performance of a hardware resource. This information is not required in order to operate the program, but, if available, is preferably used to determine the initial settings for a device. Manufacturer recommended values are those values suggested by a manufacturer as a default setup configuration setting. Other values include all other possible resource settings.

With respect to Rules 5 and 6 regarding sharing resource values, during the assignment process, all potential setting values must be checked to verify that another device has not been allocated the same value. If the value is already being used and the resource can not be shared between the devices, then the current device is prohibited from using that value. The implementation of this checking mechanism is straight forward for those resources that use a single integer value, such as IRQ's and DMA's. If there is another device using a setting value and both resources cannot share values, then a conflict exists. Checking conflicts for resources that use a range of values (memory and I/O port) requires a determination as to whether there is overlap between the ranges.

With respect to Rule 7 regarding dependent resource assignments, an example of this is as follows. The system board's serial port functionality may have choices for COM1 and COM2, where COM1 lists an IRQ resource with the setting option of 4 and an I/O Port with a range option of 3F8h–3FFh and COM2 lists an IRQ resource with the setting option of 4 and an I/O Port with a range option of 2F8h–2FFh. In order to select COM1, both IRQ4 and I/O Port 3F8h–3FFh must be made. The assignment of one resource is "dependent" upon the other. If IRQ4 cannot be assigned because of a conflict, than I/O Port 3F8h–3FFh can not be assigned. Thus, both the assignment of both of these resources should be made at the same time to insure a valid selection at the completion of the configuration process.

With respect to Rules 10 and 11, the configuration process should control which predefined areas of memory to allocate and if the memory attributes for a proposed allocation are compatible with those of the prospective device. BIOS and system hardware define specific areas or 'holes' in memory in which PCI, EISA and ISA memory can be allocated. To ensure that hardware properly routes memory accesses within these holes, memory attributes, such as cacheability, and read/write, must be programmed. This is usually accomplished by blocking specific ranges within the holes in which only one set of attributes can be programmed. Each adapter (PCI, EISA, ISA) specifies which attributes are required by its memory range. A configuration problem occurs when two devices of differing attributes share one of the defined blocks. At runtime, one of the devices will experience errors (i.e., cannot write or read to the defined memory area).

To account for these attribute-specific regions, the assignment process has to check for the following conditions for a device's memory option: (1) does the option fall within one of the 'holes', (2) does the option match the attributes of the block(s) in which the option overlaps if already programmed; and (3) can the attributes of the block(s) be programmed to reflect the device's requirements if no other device's memory range has already caused it to be programmed.

With respect to Rules 11, PnP Expansion ROMs can be designed to be more efficient in its memory usage. The result of this efficiency is the establishment of two sizes that are attributed to the PnP Expansion ROM memory requirements: Install Size and Runtime Size. Install Size is used to verify that the memory can fit within a memory 'hole' and does not overlap with any memory ranges that were scanned before this PnP Device. For efficiency, the Runtime size is used when assigning memory of devices scanned after this PnP Device. With respect to Rule 12, Memory gaps represent wasted space and potential memory resource allocation problems. Memory gaps occur with inefficient placement of devices in the memory 'holes.' The most efficient assignment is to pack memory ranges with 'like' attributes close together and to take advantage of allocating PnP Devices using the Runtime memory requirements.

With respect to Rule 13, ISA I/O Aliasing is a condition that results from the original PC/AT design that divided up the I/O space Addresses A[15:0] into the following segments:

| | |
|---|---|
| 0000h–00FFh | System Board I/O devices |
| 0100h–03FFh | I/O for use by Adapter cards |
| 0400h–FFFFh | Reserved |

For efficiency, many ISA boards only decoded I/O Address bits A[9:0] where Bits A[9:8] were used to determine if the full address should be decoded. As the use of I/O address 0400h–FFFFh was defined in later PC specifications, problems resulted from using the newer boards with the earlier ISA boards. Because the earlier boards did not decode A[15:10], these boards could not tell the difference between the ranges: 0100h–03FFh and 0900h–09FFh, . . . , 1100h–13FFh, etc. These regions became known as "ISA Aliased Regions." For the configuration rules, this implies that the rules needs to identify if any I/O setting option may overlap with an assigned I/O resource within an ISA aliased range. For example, a normal overlap of a I/O range would be Range 1=0100h–0101h with Range 2=0101h–0102h. An ISA aliased overlap would be Range 1 with Range 3=1101h–1102h.

During the Configuration Process, only one resource Type (IRQ, DMA, I/O Port, or Memory) is scheduled to be assigned at a time. This ordering conflicts with the need to support the multiple resource case (described above). For the serial port example, the following occurs during the configuration process for IRQs. If IRQ 4 is not available as a first choice, then the port in this choice is not assigned a value. If both IRQ 3 and I/O Port Range 2F8h–2FFh are available, then the second choice for the serial port can be selected and the resource values assigned.

Configuration Process

Figure 2A:
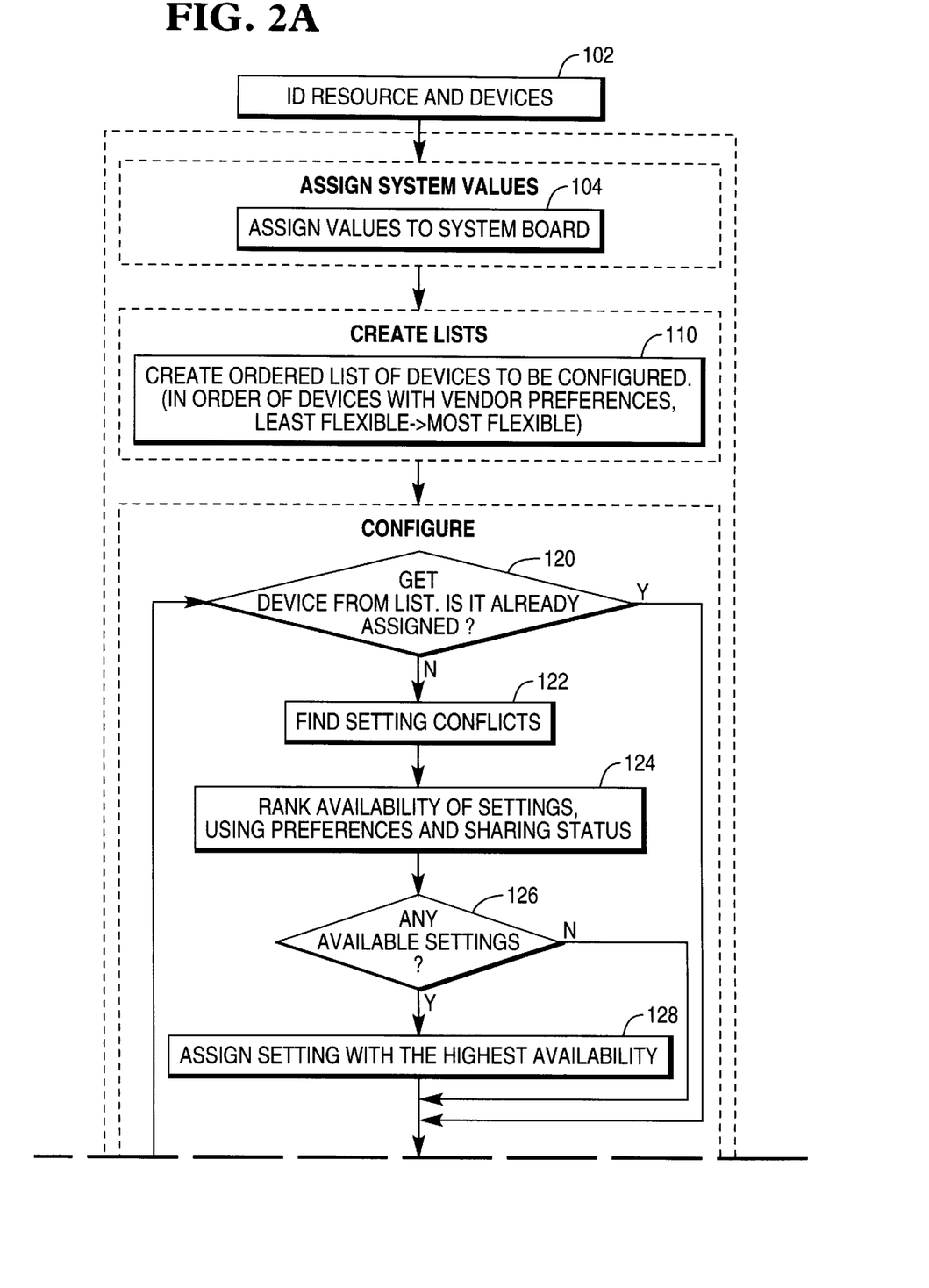
FIGS. 2A and 2B are a flow diagram illustrating program flow in the configuration process in accordance with the present invention.
Figure 2B:
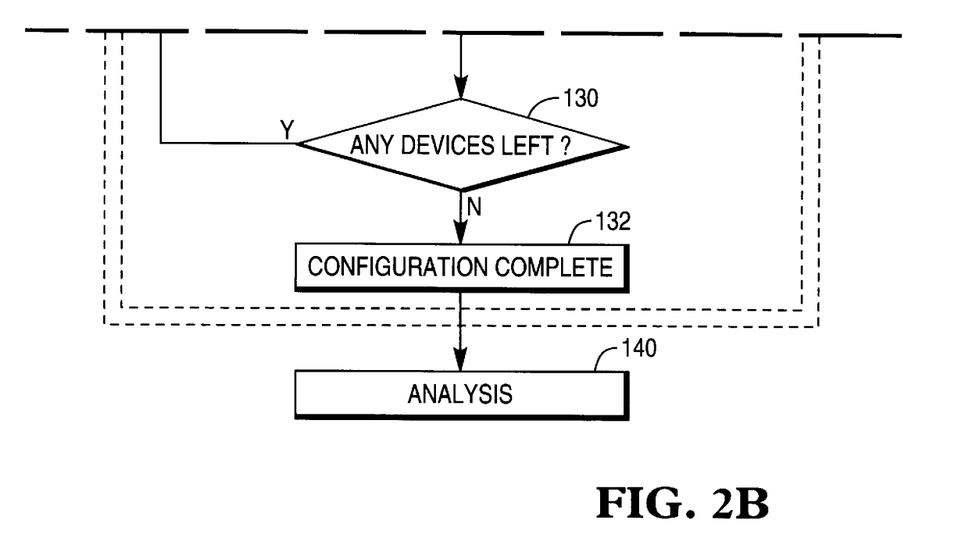

Referring to FIGS. 2A–2B, a flow chart 100 illustrating the flow of a configuration program in accordance with the present invention is shown. In step 102, the program investigates both system resources and the devices that desire access to those resources. Techniques for investigating system resources and devices connected to the system are generally known. The devices which are required for system operation are assigned first (step is 104). These devices include the mouse and keyboard and other non-plug in adapters. These devices are allocated IRQs, memory address ranges and other system resources as appropriate.

In step 110, an ordered list of devices to be configured is generated. This is implemented using the CreateList Agenda discussed above. The procedure for generating this list is generally as follows. Once an accounting of system resources has occurred (step 102), the resources are prioritized for allocation. A preferred order is IRQs, memory range, I/O ports and DMA. Thus, all the devices that desire IRQ access are grouped together in the list as are all of the devices that desire memory, I/O ports and DMA (in that order).

In step 120, the configuration routine begins and the first device is pulled from the list. This device is the least flexible device that requires IRQ access. Since this device is the first device, there will be no conflicts (accept for system board conflicts), and program flow moves through steps 122–128 (discussed below). At step 130, the list is interrogated for remaining devices and flow returns to step 120 and the second least flexible IRQ device is pulled from the list.

In step 122, setting conflicts for this device are determined. For example, does this device require an IRQ that has already been assigned and is not sharable? In step 124, the available (legal) resource settings are provided with a weighted value and rank. The weighting procedure is preferably implemented as follows. If a conflict exists, the potential resource setting is given a weight of 00. If there is no conflict, the resource is assigned a weight of 30, 20 or 10 depending on whether it has a system vendor, manufacturer or other preference setting respectively (as discussed above). If sharing is permitted, 1, 2, or 3 is respectively subtracted from the weights assigned to a system vendor, manufacturer, or other preference setting. The available IRQ (resource) settings are then ranked from highest weight to lowest weight.

In step 126, a determination is made as to whether there is an available resource setting from the ranked resources, i.e., a non-zero resource weight exists. In step 128, the resource setting with the highest weight is assigned to the device. In step 130, a determination is again made as to whether there are devices remaining on the list. Steps 120–130 are repeated for each of the devices requesting IRQ access.

When all IRQ requesting devices are assigned an IRQ resource setting, devices requesting memory (a memory resource setting) are then considered. The process for assigning memory is similar to that described above for IRQs. The process of generating a weight for a memory resource is, however, performed somewhat differently. Memory resources (areas of memory) are taken in the order detected, from low to high available memory. The first available (and legal) memory resource that is detected receives a weight of 30 and subsequent resources receive a weight of 10. If the memory resource can be shared, then 100 is added to the initial weight to produce weights of 130 and 110, respectively. If there are no legal memory resource settings available, then the weight is set at 00.

A memory assigning cycle through steps 120–130 is generally as follows. A device requesting memory is pulled from the list (step 120). The legal settings for this device are investigated for a setting conflict (step 122). In step 124, the above ranking is undertaken and in step 126 a determination is made as to whether any of the ranked settings are available. In step 128, the device is assigned to the resource with the highest setting weight. In step 130, the program loops to consider the next memory requesting device or to consider the first I/O port requesting device. The program of steps 120–130 preferably loops until all I/O port requesting devices and then all DMA requesting devices (and any other devices) are accounted for. Step 132 indicates that the configuration is complete.

In step 140, an analysis is conducted to determine if the configuration was successful. The analysis preferably checks whether:

1. A device does not function in the system, e.g. the device is not supported by the OS (no driver);
2. Two incompatible devices are found in the system and either cannot function in the same system or both devices are unnecessary in this system and result in the waste of resource assignments;
3. A device is not on a preferred PCI bus;
4. A device is not in a preferred slot;
5. A device/function is in a disabled state;
6. The maximum of a number of a particular device in the system is exceeded;
7. A device's configuration is incomplete, for example, an IRQ has not been assigned to the device;
8. Two devices are illegally sharing a resource value or their ranges overlap;
9. Sub-optimal assignment has be given to a devices resource, for example, a resource value was assigned that may impact the performance of the device; and
10. Other system vendor non-conformities exist, including those dependent on operating system.

These steps are carried out within the Analysis Ruleset. Once the analysis is complete, the user is presented with a list of messages generated during the analysis. The user will select a message to resolve. Once selected, a list of resolution 'hints' for the message will be generated. The hints presented are dependent upon the problem described in the message and may include one or more of the following:

1. Edit the device;
2. Delete the device;
3. Move the device;
4. Change selection to another selection defined within this hint; and
5. Ignore the message.

Figure 3:
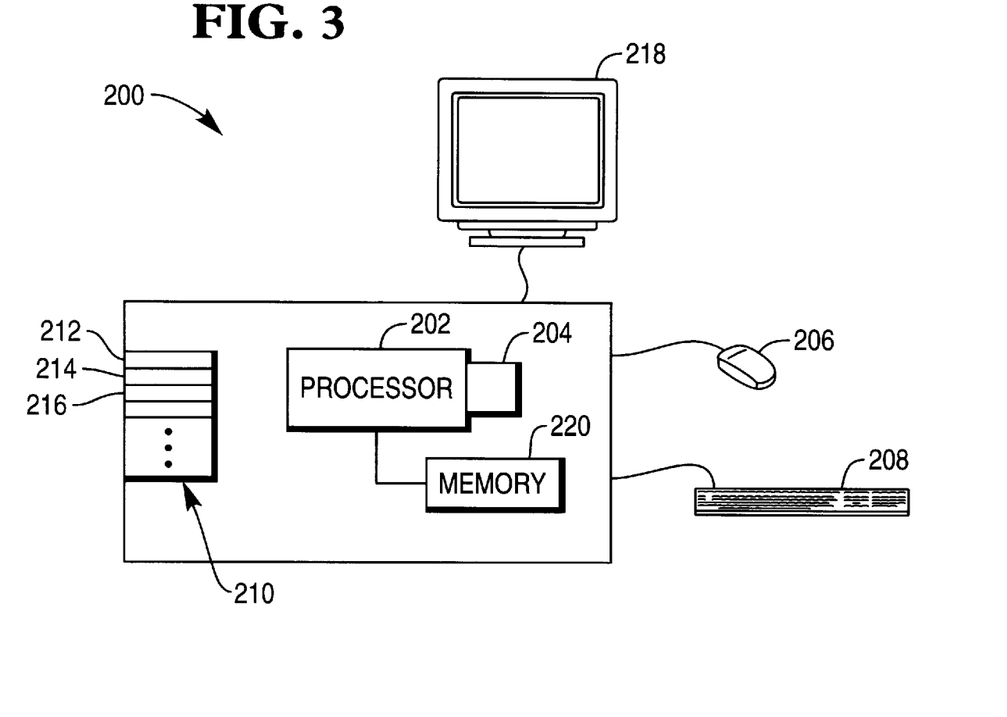
FIG. 3 is a block diagram of a computer apparatus for executing the program of FIGS. 1, 2A and 2B.

Referring FIG. 3, a block diagram of a computer apparatus for executing the program described with reference to FIG. 1 in accordance with the present invention is shown. The computer 200 includes a processor 202 (which contains interrupt logic, I/O port control, and DMA channels, etc.), local memory 204, a mouse 206, a keyboard 208, a plurality of adapter slots 210, including a sound card 212, a modem 214, a network adapter card 216, a monitor 218, and a mass storage device 220. The program of FIG. 1 may be resident in the mass storage device 220 and called into local memory 204 and executed by processor 202 as desired. The program preferably updates the CMOS and NVRAM of the processor as appropriate.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A method of configuring a computer system having a plurality of system resources and a plurality of devices that require access to those resources, comprising the steps of:

detecting the system resources of the computer including interrupt request lines, direct memory access channels, input/output ports, and memory;

detecting devices within the computer that require access to the system resources;

creating an ordered list of the devices to be configured based at least in part on device flexibility and device resource sharing capability;

investigating possible conflicts between devices to determine appropriate position in said ordered list;

preliminarily allocating said resources to said devices based on said ordered list;

analyzing the success of this preliminary allocation to determine potential setup and assignment problems;

modifying the preliminary allocation, if necessary, to resolve potential setup and assignment problems;

creating a final allocation, when any setup and assignment problems are resolved; and storing said final allocation as part of a configuration of said computer system.

2. The method of claim 1, wherein said investigating step and said preliminarily allocating step, including the step of implementing a conflict finding analysis before assigning any of said devices to said resources.

3. The method of claim 1, further comprising the steps of:
   generating potential solutions for setup and assignment problems.

4. The method of claim 1, wherein said ordered list creating step includes the step of assigning a setting value to each device.

5. The method of claim 1, wherein said ordered list creating step includes the step of dividing each of said devices into a device group based on device type and assigning a setting value to each device within each group, said setting value determining the order of a device within a group.

6. The method of claim 5, wherein said ordered list creating step includes the step of ordering said device groups.

7. The method of claim 1, further comprising the step of creating said ordered list with a rules based inference engine.

8. The method of claim 1, wherein said allocating step comprises the step of assigning devices to resources with a rules based inference engine and only assigning the devices after checking for conflicts in a proposed assignment.

9. A method for configuring a computing system having a plurality of system resources and plurality of devices that require access to those resources, comprising the steps of:

identifying the computer system resources;

identifying all devices that require access to those resources;

dividing identified devices into groups based on device type to create at least the IRQ, memory, I/O port and DMA device groups;

assigning a setting value to each device within the IRQ group, based at least in part on sharing ability, to thereby reduce conflicts between IRQ needing devices;

assigning a setting value to each device within the memory group, based at least in part on sharing ability, to thereby reduce conflicts between memory needing devices;

assigning a setting value to each device within the I/O port group to thereby reduce conflicts between I/O port needing devices;

assigning a setting value to each device within the DMA group to thereby reduce conflicts between DMA needing devices;

allocating IRQ, memory, I/O port and DMA needing devices to resources based at least in part on the assigned setting values;

analyzing the success of that allocation; and saving data for a successful allocation.

10. The method of claim 9, further comprising the step of presenting a user with a message for each device for which allocation was not successful.

11. The method of claim 10, further comprising the step of generating, in response to selection of a non-successful allocation message by a user, a potential solution for the corresponding device.

12. The method of claim 9, further comprising the step of assessing the IRQ group before other device groups.

13. The method of claim 9, further comprising the step of assessing said device groups in the following order: IRQ, memory, I/O port and DMA.

14. The method of claim 9, further comprising the step of assigning a setting value for one or more devices in one or more of said groups based on device preference settings.

15. The method of claim 9, further comprising the step of assigning a setting value for one or more devices in one or more of said groups based on relative flexibility of allocation, from least to most.

16. The method of claim 9, further comprising the step of utilizing an inference engine to assign said setting values.

17. A computer apparatus, comprising logic the performs the steps of:

detecting the system resources of the computer including interrupt request lines, direct memory access channels, input/output ports and memory;

detecting devices within the computer that require access to the system resources;

creating an ordered list of the devices to be configured based at least in part on device flexibility and device resource sharing capability;

investigating possible conflicts between devices to determine appropriate position in said ordered list;

preliminarily allocating said resources to said devices based on said ordered list;

analyzing the success of this preliminary allocation to determine potential setup and assignment problems;

modifying the preliminary allocation, if necessary, to resolve potential setup and assignment problems;

creating a final allocation, when any setup and assignment problems are resolved; and storing said final allocation as part of a configuration of said computer system.

* * * * *